2 Sheets—Sheet 1.

G. LIZARS.
Wet Gas-Meter.

No. 213,911. Patented April 1, 1879.

WITNESSES:
W. W. Hollingsworth
Amos M. Hart

INVENTOR:
G. Lizars
BY
ATTORNEYS.

G. LIZARS.
Wet Gas-Meter.
No. 213,911. Patented April 1, 1879.
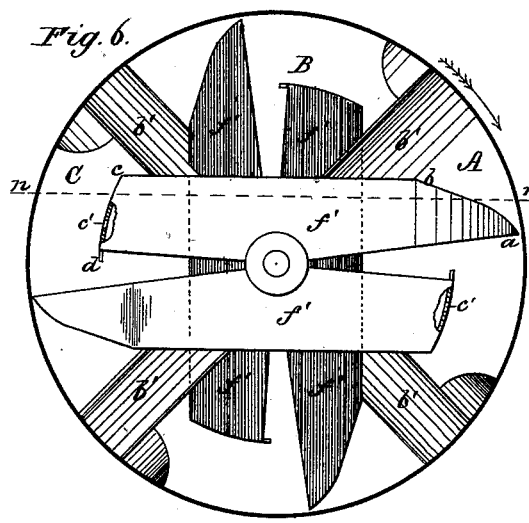
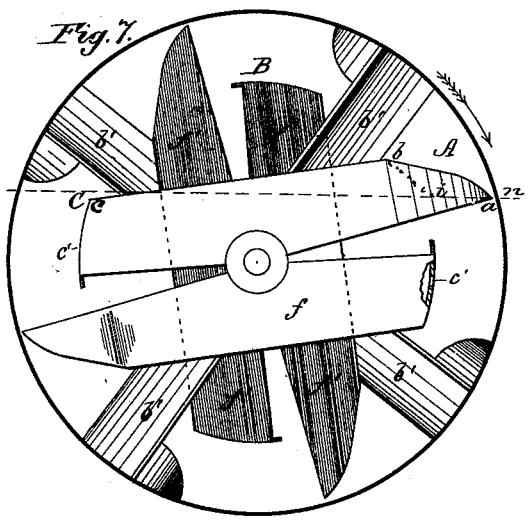
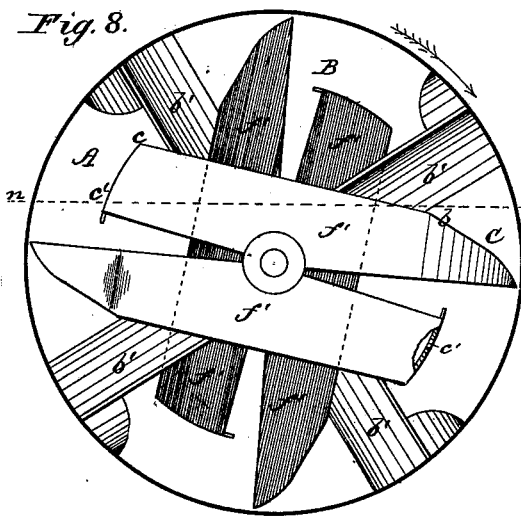
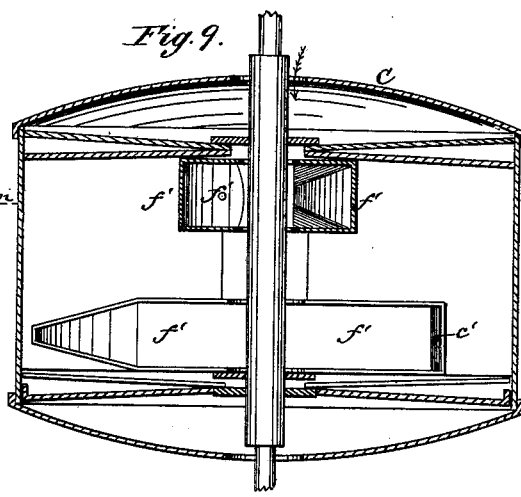
WITNESSES:
W. W. Hollingsworth
Amos W. Hart
INVENTOR:
G. Lizars
BY
ATTORNEYS.

UNITED STATES PATENT OFFICE.

GEORGES LIZARS, OF PARIS, FRANCE, ASSIGNOR TO A. DE SIRY-LIZARS & CO., OF SAME PLACE.

IMPROVEMENT IN WET GAS-METERS.

Specification forming part of Letters Patent No. 213,911, dated April 1, 1879; application filed October 7, 1878; patented in France, December 29, 1877.

*To all whom it may concern:*

Be it known that I, GEORGES LIZARS, of Paris, France, have invented Improvements in Wet Gas-Meters; and I do hereby declare that the following is a full, clear, and exact description of the same, reference being had to the annexed sheets of drawings, making a part of the same.

This invention of improvements in wet gas-meters relates to a compensating measuring-drum, by which a uniform amount of gas is passed through the meter, notwithstanding any variation in the level of the water, so that the meter always delivers the quantity registered, and no more.

The common description of gas-meters, although they register correctly when the water is at the proper height, is open to the objection that when, in consequence of evaporation, the water-line falls below that level, the capacity of the compartments is increased, and they then receive and deliver more gas at each revolution of the drum than before, so that the index consequently registers less gas than has actually passed through the meter.

This objection is obviated by this invention, which consists, mainly, in making the several compartments communicate in such manner that when the water-line falls below the proper height the gas in excess of the normal quantity which each compartment could contain when the water was at its proper level becomes transferred from the filled compartment to the next one being filled. Thus any variation of the water-level is compensated, and the drum always delivers the same amount of gas at each revolution, and the meter, consequently, registers correctly at all times. This system of compensation may be applied to all kinds of wet gas-meters.

Figure 1:
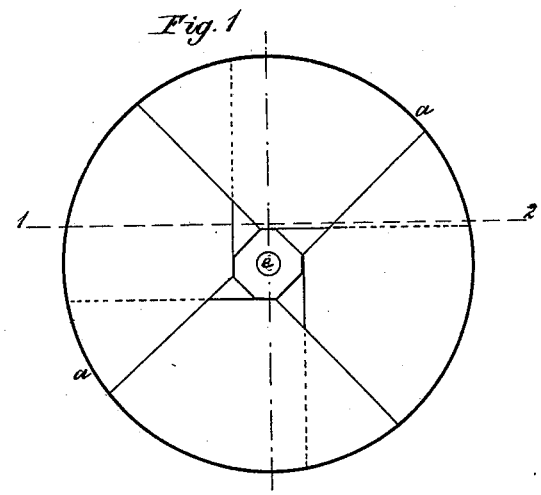
Figure 2:
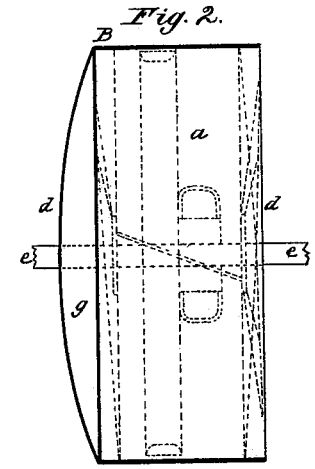
Figure 3:
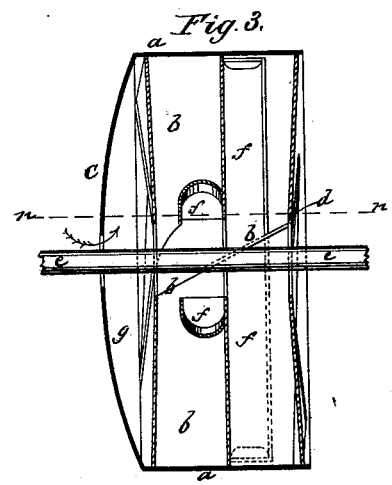
Figure 4:
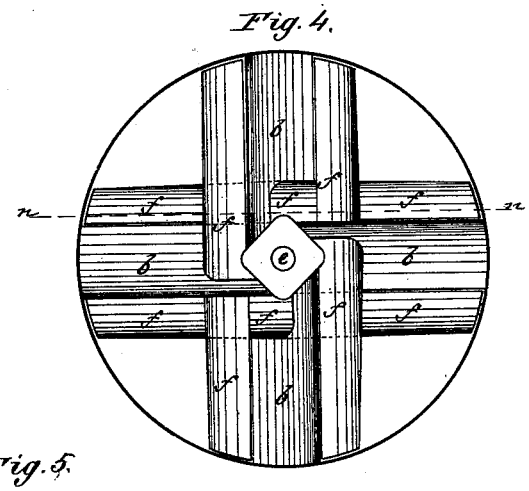
Figure 5:
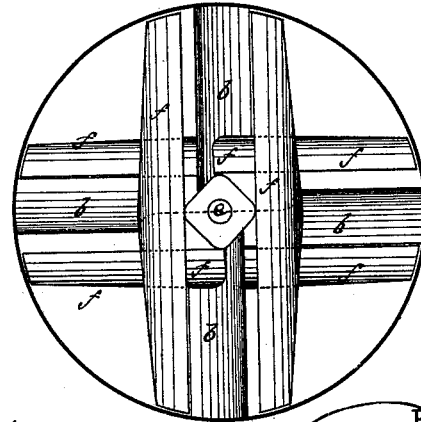

The invention is illustrated, by way of example, in the accompanying drawings, (two sheets,) in Sheet 1 of which Figure 1 shows a face view of the drum removed from the outer case of the meter; Fig. 2, a plan; and Fig. 3, a section taken on line 1 2, Fig. 1. Figs. 4 and 5 are different vertical sections of the drum.

The same letters of reference indicate the same parts in all the figures.

In said Sheet 1, $a$ is the drum, divided into four compartments by inclined partition plates $b$, as usual; $c$, front end of the drum, through which the gas passes into the compartments; $d$, back end of drum, with passages for the egress of the gas to the outlet; $e$, drum-spindle; $g$, convex cover through which the gas is introduced.

$f\,f$ are four U-shaped troughs or channels, placed in pairs, the two troughs of each pair being face to face and parallel, and the one pair being at right angles to the other. By these troughs $f\,f$ the several compartments of the drum are placed in communication with each other, as shown. These channels, as they emerge in succession above the water, are inverted, and each serves to conduct the gas in excess of the normal quantity from the filled compartment into the next one which is being filled, thus compensating for the fall of the water-level, as above described. The greater the fall the more gas is transferred by the channels, the dimensions of the latter being such that they will receive above the water-line a volume of gas equal to the increase in the capacity of the compartments due to the fall of the water-level.

The channels may be of any suitable form or section, and may be placed in the position shown or inclined, as hereinafter described. They may also be made to extend through two partitions instead of one, and thus connect alternate compartments. The gas may be admitted through apertures in the circumference $a$, instead of through the front $c$, as usual, the channels being in this latter case inclosed on the under side from the opening in the circumference $a$ to the center of the drum.

I will now describe a modified arrangement of the channels. (Shown in Sheet 2, Figs. 6, 7, 8, 9.) Each channel $f$ traverses two partitions, $b'$, and is shorter than those shown in Figs. 1, 2, 3, 4, and 5. The length of the channels may be thus reduced without increasing their breadth, as, owing to the position which they occupy in the compartments through which they pass, they reduce the water-surface of the compartments, and the volume of the gas to be transferred in consequence of a fall of the water-level is consequently diminished.

Figs. 6, 7, 8, and 9 show sectional elevations of the interior only of a measuring drum, with its partitions, and the channels connecting opposite compartments, which constitute the invention, the passages for the admission and exit of gas, &c., being omitted.

The motion of the drum is in the direction indicated by the arrows and the water-line at $n$.

The channel shown in action in the figures—viz., that connecting the compartments A and C, and traversing the intermediate compartment, B—transfers the excess of gas from A to C in the following manner: When the channel is in the position shown in Fig. 7, the gas it contains occupies the space $a\ b\ c$, and the rotary motion being continued until a small orifice, $c'$, at the opposite end of the channel is about to rise above the water, as in Fig. 8, the gas then occupies the space $b\ c\ c'$, which being rather smaller than space $a\ b\ c$, as will be presently explained, the pressure of this volume of gas is therefore slightly increased, so as to be about equal to the pressure of gas in compartment C.

Should there be any slight difference in these pressures it will be equalized as soon as the channel and compartment communicate by orifice $c'$, so that the end of the channel may leave the water without causing any agitation. The increase in the pressure of gas after it enters the channel is caused by an enlargement or hood, $a\ b\ c$, formed at the inlet end of the channel, (see Fig. 7,) so that the gas, when it first enters the channel, occupies the spaces $a\ b\ i$ and $i\ b\ c$, and when the channel assumes the position indicated in Fig. 8 its capacity becomes contracted to the space $b\ c\ c'$, which is equal to $i\ b\ c$, and as the channel still contains the extra volume of gas which filled $a\ b\ i$, there will consequently be an increase of pressure. The volume $a\ b\ i$ is calculated so that the increase of pressure shall equal from two to three millimeters, which is the difference in pressure of the gas in the compartments C and A, and as C communicates with the gas-inlet and A with the outlet, these two or three millimeters represent the pressure absorbed by the working of the meter.

I am aware a revolving gas-meter has been provided with measuring-chambers having a diminished capacity toward or at the axis thereof, where they communicate, as in United States Patent No. 27,564, the object being to reduce the amount of variation in the quantity of gas measured by any variation between the maximum and minimum height of water in the meter.

I claim—

1. In a gas-meter, in combination with the partitions thereof, the channels or troughs passing through said partitions, and arranged on opposite sides of the axis, but parallel, and with their open sides toward each other, as shown and described, and for the purpose specified.

2. The channels connecting the alternate compartments of a gas-meter measuring-drum, constructed, as described, with the enlargements or hoods $a\ b\ c$ at the forward ends of the said channels, as and for the purpose specified.

3. The straight, or nearly straight, troughs or channels connecting the adjoining compartments of a gas-meter measuring-drum, provided with orifices $c'$ at the rear ends, substantially as and for the purpose specified.

GEORGES LIZARS.

Witnesses:
 ROBT. M. HOOPER,
 EUGÈNE HÉBERT.